United States Patent
Song et al.

(10) Patent No.: US 7,921,194 B2
(45) Date of Patent: Apr. 5, 2011

(54) METHOD AND SYSTEM FOR REMOTE ACCESS TO UNIVERSAL PLUG AND PLAY DEVICES

(75) Inventors: Yu Song, Pleasanton, CA (US); Doreen Cheng, San Jose, CA (US); Alan Messer, Los Gatos, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 374 days.

(21) Appl. No.: 11/805,622

(22) Filed: May 23, 2007

(65) Prior Publication Data

US 2007/0233845 A1   Oct. 4, 2007

Related U.S. Application Data

(63) Continuation-in-part of application No. 11/713,516, filed on Mar. 1, 2007.

(60) Provisional application No. 60/812,459, filed on Jun. 8, 2006, provisional application No. 60/812,577, filed on Jun. 8, 2006, provisional application No. 60/781,475, filed on Mar. 9, 2006.

(51) Int. Cl.
*G06F 15/173* (2006.01)

(52) U.S. Cl. ........................ 709/223; 709/227

(58) Field of Classification Search .................. 709/223, 709/224, 227
See application file for complete search history.

(56) References Cited

U.S. PATENT DOCUMENTS

| | | | |
|---|---|---|---|
| 6,924,727 B2 | 8/2005 | Nagaoka et al. | 340/3.1 |
| 7,523,225 B2 | 4/2009 | Saint-Hilaire et al. | |
| 2006/0031459 A1* | 2/2006 | Ahn et al. | 709/224 |
| 2006/0037036 A1 | 2/2006 | Min et al. | |
| 2006/0153072 A1 | 7/2006 | Bushmitch et al. | |
| 2006/0168320 A1 | 7/2006 | Kidd et al. | |
| 2006/0168656 A1* | 7/2006 | Stirbu | 726/15 |
| 2006/0184693 A1 | 8/2006 | Rao et al. | |
| 2007/0127394 A1 | 6/2007 | Stirbu et al. | |
| 2007/0233845 A1 | 10/2007 | Song | |
| 2008/0112419 A1* | 5/2008 | Lee et al. | 370/401 |
| 2008/0275940 A1* | 11/2008 | Yamada et al. | 709/203 |

FOREIGN PATENT DOCUMENTS

KR   1020040005464   1/2004

OTHER PUBLICATIONS

U.S. Office Action for U.S. Appl. No. 11/713,516 mailed Aug. 7, 2009.
U.S. Notice of Allowance for U.S. Appl. No. 11/713,516 mailed on Feb. 23, 2010.

* cited by examiner

*Primary Examiner* — Joseph E Avellino
*Assistant Examiner* — Marshall McLeod
(74) *Attorney, Agent, or Firm* — Kenneth L. Sherman, Esq.; Michael Zarrabian, Esq.; Myers Andras Sherman & Zarrabian LLP

(57) ABSTRACT

A method for remote access to one or more Universal Plug and Play (UPnP) resources in a network is provided. An access policy for discovery of a UPnP resource in the network is maintained. Upon receiving a remote discovery request from a remote requester over a communication link, the access policy is consulted and it is determined if the resource is discoverable. If the resource is discoverable, then resource information is provided to the requester over the communication link.

32 Claims, 6 Drawing Sheets

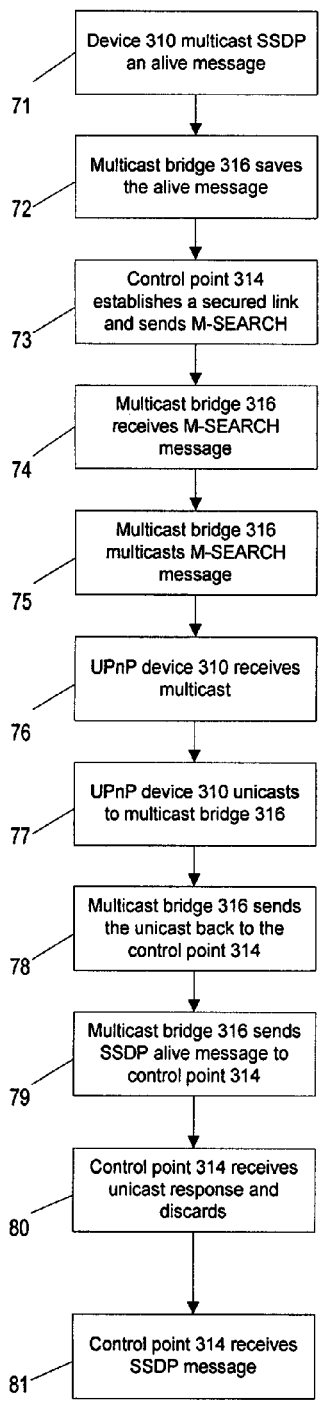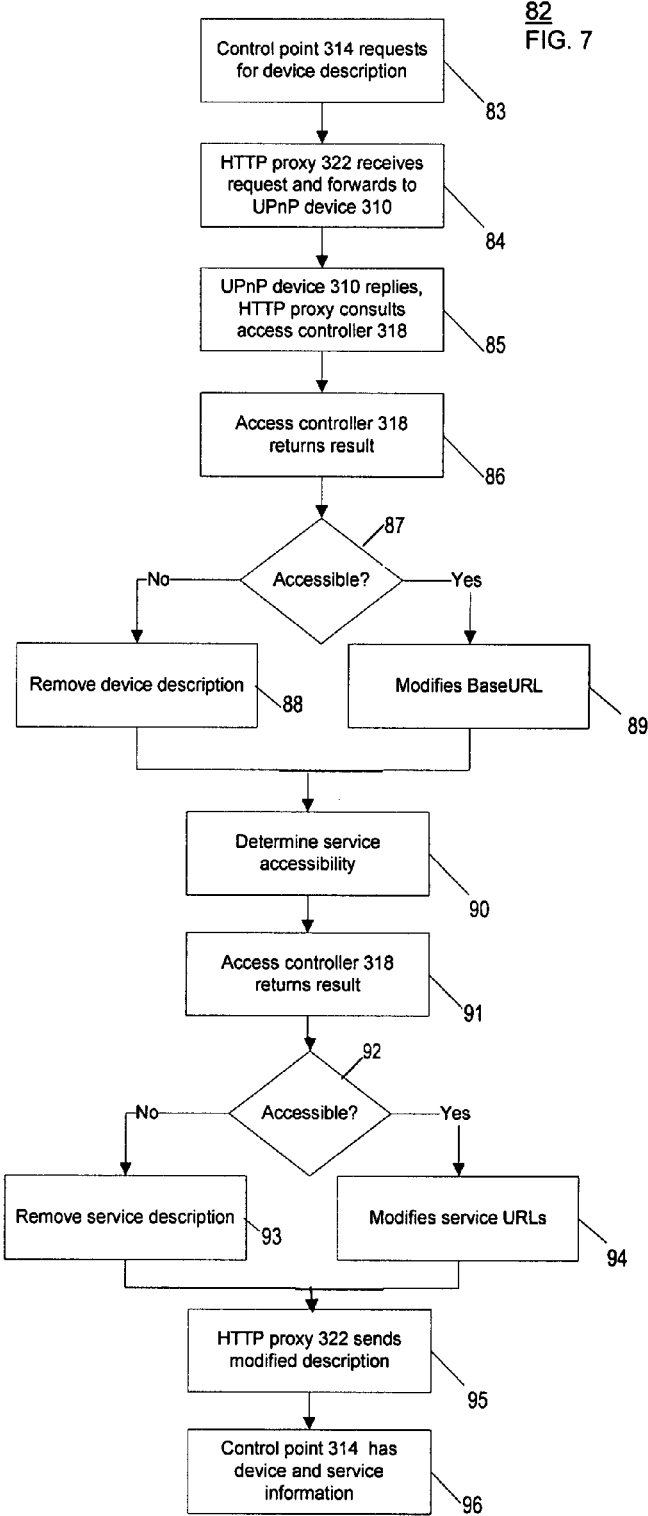

METHOD AND SYSTEM FOR REMOTE ACCESS TO UNIVERSAL PLUG AND PLAY DEVICES

RELATED APPLICATIONS

This application claims priority from U.S. Provisional Patent Application Ser. No. 60/812,459 filed Jun. 8, 2006, incorporated herein by reference, and U.S. Provisional Patent Application Ser. No. 60/812,577 filed Jun. 8, 2006, incorporated herein by reference, and this application is a Continuation-in-Part of U.S. patent application Ser. No. 11/713,516, filed Mar. 1, 2007, which claims benefit of U.S. Provisional Application Ser. No. 60/781,475, filed Mar. 9, 2006, both of which are incorporated herein by reference.

FIELD OF THE INVENTION

The present invention relates to Universal Plug and Play (UPnP) devices, and in particular, relates to access to UPnP devices in a network.

BACKGROUND OF THE INVENTION

Universal Plug and Play (UPnP) is increasing in importance as a standard for private area networking such as home networking. UPnP, however, does not provide support remote access to devices in a private area network over other networks such as the Internet or another private area network.

The Internet enables devices to be connected essentially anywhere at anytime. Utilizing the Internet, users desire to access content/services in private networks such as a home network, and control devices and services in such networks from anywhere (e.g., remotely) and at any time. As such, there has been a need for an approach that enables UPnP devices on the Internet, or UPnP devices in a private network, or access to UPnP devices in another private network.

The Simple Service Discovery Protocol (SSDP) forms the foundation of the UPnP standard. A first aspect of the SSDP involves service discovery requests. The UPnP control point in a UPnP network multicasts requests to look for any online UPnP devices in the network. The UPnP device listens for such requests, and when it receives such a request, the UPnP device sends a unicast response back to the requesting UPnP control point. The UPnP device also periodically advertises itself by multicasting its presence in the network. When a UPnP control point receives such advertisement, it can consider the advertising UPnP device as online and ready to be used.

The multicast request/unicast response mechanism works reasonably well in a private network, because a private network usually comprises a simple network wherein a multicast message can reach every UPnP device and UPnP control point in the network. If a private network includes multiple subnets, a multicast forwarding module in each of the subnet routers enables multicast messages to travel across subnets and reach every device in the network.

The SSDP protocol breaks down, however, for remote access to UPnP devices in a network, due to security concerns. There are two types of remote access. The first type involves a remote device directly connected to a private network including a gateway via a secured link (e.g., a virtual private network (VPN) connection). The gateway can be configured such that the remote device that connects to the private network via the secured link becomes a part of the private network (e.g., the remote device is temporarily assigned a private Internet Protocol (IP) address such that it can communicate with other devices in the network via user datagram protocol (UDP) and/or transport control protocol (TCP) communication directly).

The second type of remote access is to allow devices in one private network to connect to devices in another private network via a secured link (e.g., a VPN). This is typically achieved by setting up a secured link between gateways in the two networks such that a gateway that initializes the secured link is temporarily assigned a private IP address by the other gateway. As a result, a gateway in one network can reach any device in the other network.

In remote access cases, security must also be considered. For example, if a homeowner's mobile device establishes a secured link back to the homeowner's home network, the homeowner would desire to "see" and control all available devices in the home network. However, if a guest's mobile device establishes a secured link to a home network, the homeowner would desire to control what devices, services and contents can be "seen" or controlled by the guest. The same security concern applies to a home-to-home scenario, wherein a home gateway establishes a secured link to a remote home network, such that the remote home network's owner desires to control which devices, services and contents can be seen by a guest.

Such security concerns are not addressed by the SSDP discovery protocol, because in the SSDP protocol, a UPnP control point multicasts a request message, and expects a discovered device to respond to the control point directly via a unicast response. This means that multicast messages must be forwarded by the private network gateway, and the remote UPnP control point on a communication link that makes such multicast requests can be directly reachable by UPnP devices in the other networks. Such direct reachability makes a private network vulnerable to security attacks because the private network gateway cannot enforce the security policy on the incoming access requests from the remote UPnP control point, and further the gateway cannot enforce security policies for any messages originating from devices in the network and terminating on the remote UPnP control point.

The multicast message forwarding between the remote UPnP control point and UPnP devices in a private network can be enabled by a multicast forwarding module in the private network gateway. For security, such multicast forwarding should be turned off such that the UPnP control point can only discover devices and services in the private network under the control of the network owner. Turning off the multicast forwarding also disables advertisements from UPnP devices in the network from reaching the remote UPnP control point. However, turning off multicast forwarding completely disables the SSDP.

Further, the conventional UPnP architecture is designed for consumer electronics devices in a home networked environment, which is typically a local area network (LAN). Therefore, timeout in the conventional UPnP SSDP assumes small network latency in transporting UPnP messages. Accessing home devices remotely via the Internet typically incurs large, unpredictable network latency that usually results in responses to the SSDP M-SEARCH to timeout. As a result, a remote control point cannot detect a device in a remote home network even if it is operational and online.

In addition, for security and privacy reasons, such a homeowner would desire to control devices and services that can be remotely controlled via the Internet. For example, a home surveillance camera should not be accessible by anyone on the Internet unless the remote user is a homeowner or an authorized user. Because UPnP is designed for a home networking environment, security is not a major concern on the UPnP architecture. However, security is a critical concern when UPnP is extended for remote access. Existing UPnP security architectures do not address access control device and service discovery. In essence, conventionally all UPnP devices and services can be discovered using the SSDP, and access control is applied when a service is being accessed on a device. However, this has two disadvantages. First, making every device and service in a home network discoverable on the Internet raises privacy concerns. Second, a user cannot selectively control the actions that a remote device can perform on a device in the network. For example, a homeowner cannot specify that a remote device can view video from a surveillance camera in the network, but cannot change the viewing angle of the camera.

There is, therefore, a need for method and system for remote access to UPnP devices, allowing multicast forwarding such that message forwarding occurs at the UPnP layer instead of at the IP layer, where security policy at the UPnP layer cannot be enforced. There is also a need for such a method and system to address the remote access timeout problem, and provide improved discovery and access control for UPnP devices and services in a network.

BRIEF SUMMARY OF THE INVENTION

The present invention provides a method for remote access to one or more Universal Plug and Play (UPnP) resources in a network. In one embodiment this involves maintaining an access policy for discovery of a UPnP resource in the network; upon receiving a remote discovery request from a remote requester over a communication link, consulting the access policy and determining if the resource is discoverable; and if the resource is discoverable, then providing resource information to the requester over the communication link.

In one implementation, access control involves controlling remote discovery of UPnP devices and/or services using an access controller that checks access policies before allowing remote device and/or service discovery. Such remote access to a UPnP device further involves providing a proxy and a multicast bridge in a network, including a UPnP device. The proxy provides access to the UPnP device over a communication link, by performing message forwarding at the UPnP layer in the network, whereby the UPnP control point accesses the UPnP device via the proxy over the communication link. Message forwarding includes performing UPnP message forwarding such as UPnP SSDP multicast forwarding at the UPnP layer.

Access control further involves proactively sending out device advertisements such as UPnP SSDP advertisements in addition to normal SSDP M-SEARCH responses. The proactive device SSDP advertisement reduces the wait interval for a remote control point in receiving a device SSDP advertisement, wherein even if the control point does not receive a SSDP response message from the UPnP device within a specified interval, the control point still receives the device SSDP advertisement without waiting for an entire timeout interval.

These and other features, aspects and advantages of the present invention will become understood with reference to the following description, appended claims and accompanying figures.

BRIEF DESCRIPTION OF THE DRAWINGS

FIG. 6 shows a flowchart of the steps of an example process for remote access to UPnP devices in the network in FIG. 5, according to an embodiment of the present invention.

FIG. 7 shows a flowchart of the steps of another example process for remote access to UPnP devices in the network in FIG. 5, according to an embodiment of the present invention.

DETAILED DESCRIPTION OF THE INVENTION

The present invention provides a method and system for remote access to UPnP devices, such as UPnP devices in a private network or a LAN, such as a home network. The present invention also enables UPnP devices to operate correctly when a UPnP control point attempts to remotely discover UPnP devices and services in a network via a communication link, such as the Internet, by addressing the aforementioned timeout issue in the conventional UPnP architecture. The present invention further enables a network owner to control which network devices and/or services can be discovered by the remote access device via the communication link.

Example implementations of the present invention are described below, wherein multicast forwarding occurs at the UPnP layer instead of the IP layer. Such UPnP layer multicast forwarding provides enforcement of security policy at the UPnP layer and does not require changes to the UPnP specification. Further, existing remote UPnP control points (e.g., on the Internet and/or in other networks) can remotely access devices, services and contents in a private network without modification to UPnP standards. As such, existing UPnP devices can operate without modification within the context of the present invention. Further, multicast forwarding in a private network gateway is not required.

Figure 1:
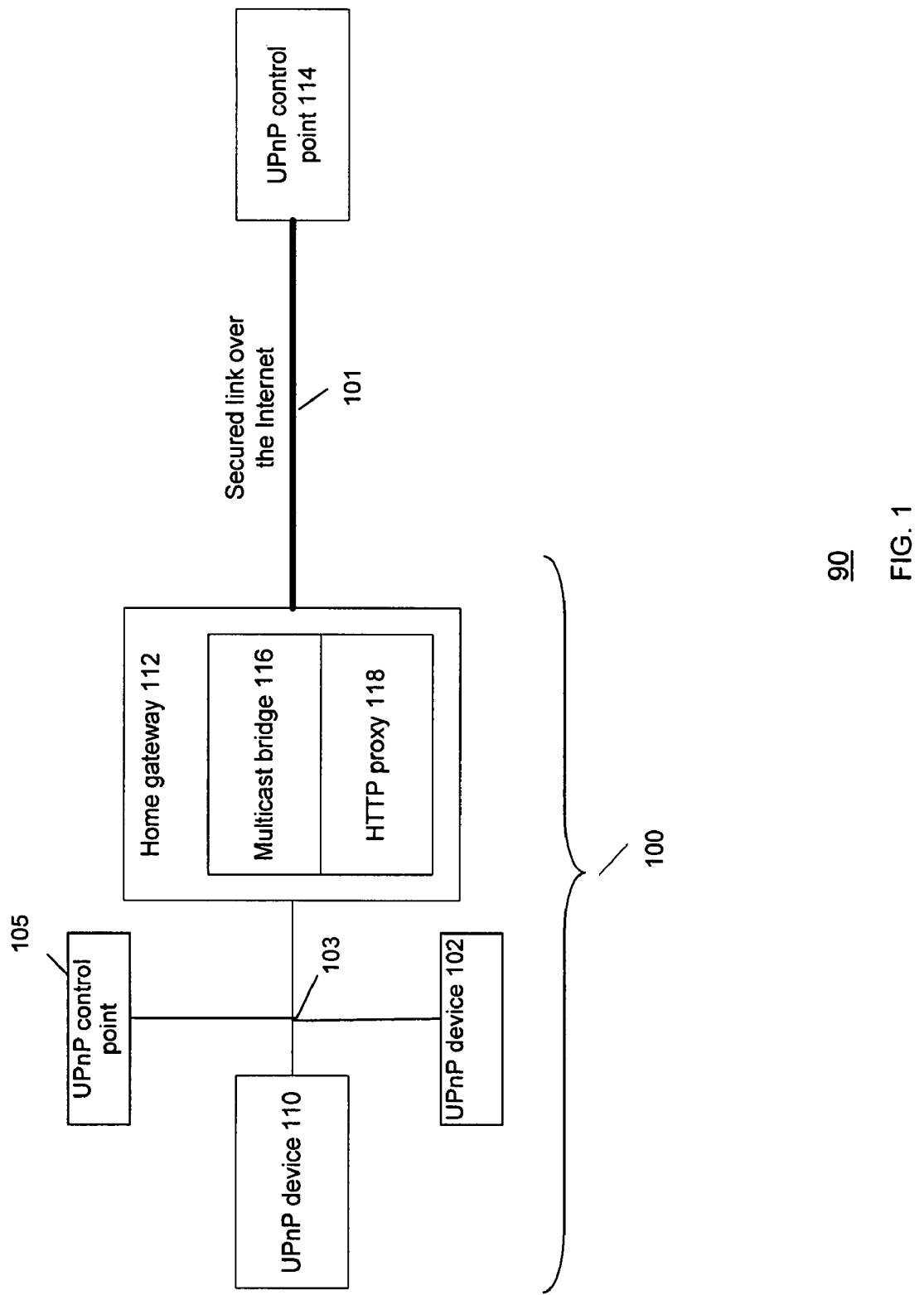
FIG. 1 shows a functional block diagram of an example system which implements remote access to UPnP devices in a private network, according to the present invention.
Figure 2:
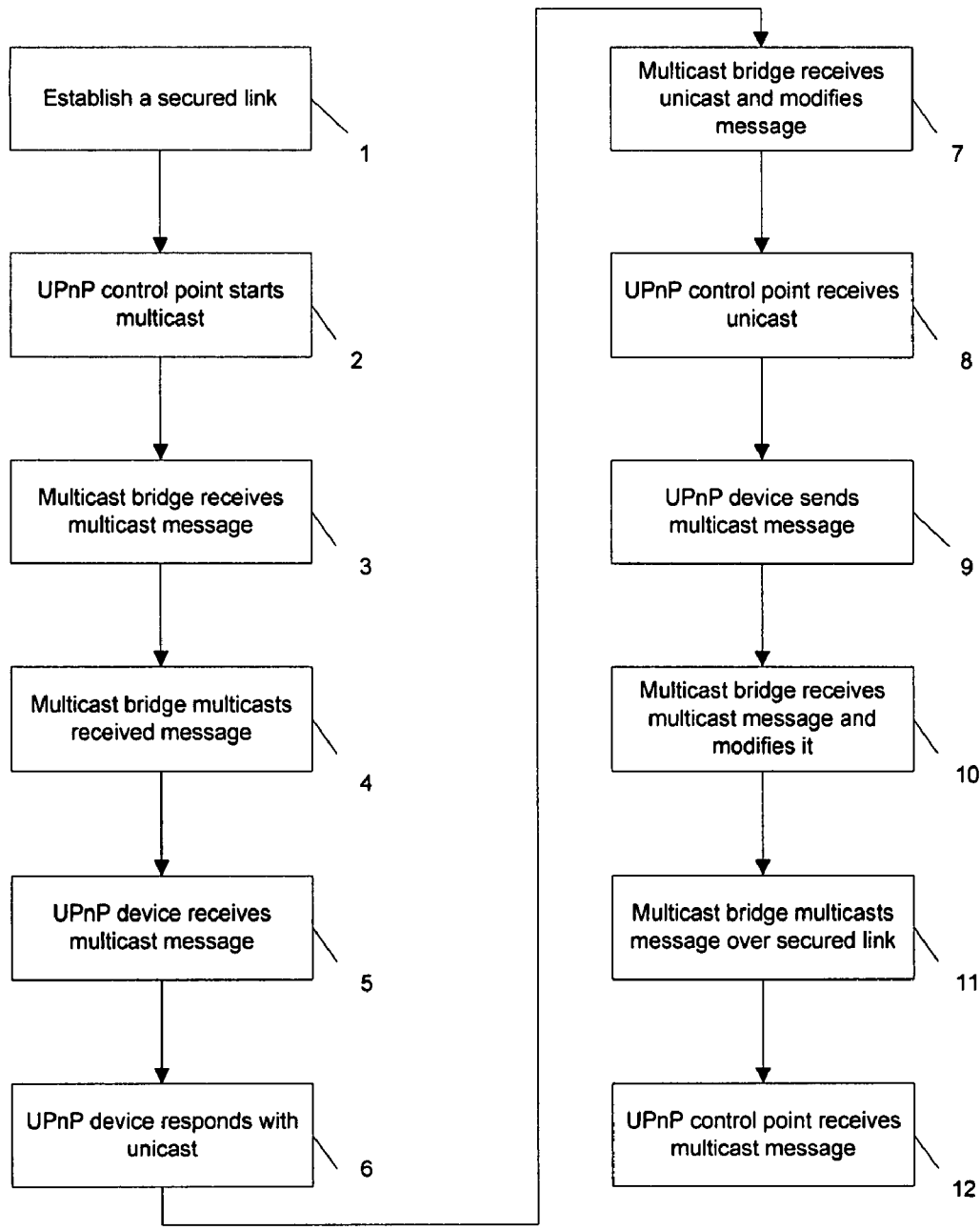
FIG. 2 shows a flowchart of the steps of an example process for remote access to UPnP devices in the private network in FIG. 1, according to an embodiment of the present invention.

Referring to the example functional block diagram in FIG. 1 and the corresponding flowchart in FIG. 2, according to the present invention, an example process of a remote UPnP control point accessing devices in a private network via a communication link is now described.

FIG. 1 shows an example system 90 wherein a private network 100 includes at least one UPnP device 110 (e.g., a media server, a consumer electronics device, a PC, etc.) and a gateway 112. The network 100 can include other devices such as another UPnP device 102 and a local UPnP control point 105. The gateway 112 and the UPnP device 110 are connected via a LAN 103, such as Ethernet, 802.11x, etc. A remote UPnP control point 114 can connect to the network 100 via a communication link 101 (e.g., a secured link over the Internet), wherein the control point 114 has a public IP address and can be reached via that public IP address.

The gateway 112 comprises a multicast bridge 116 and an HTTP proxy 118. The multicast bridge 116 functions as an interface bridge between the home network 100 and the link 101 to the remote control point 114, wherein the bridge 116 forwards a multicast/unicast message from the network 100 through the link 101 and vice versa.

The HTTP proxy 118 relays the UPnP request and response messages (including messages to obtain device and service descriptions, service invocation and eventing) between the remote UPnP control point 114 and the devices in the network 100 (e.g., device 110).

In one example, to access the UPnP device 110 in the network 100, the remote UPnP control point 114 must first send requests to the HTTP proxy 118 wherein the HTTP proxy 118 then forwards the requests to the devices (e.g., UPnP device 110) in the network 100. Optionally, access control measures can be established in the HTTP proxy of each network to enforce security.

Referring to the example process 15 in FIG. 2, the remote UPnP control point 114 accesses the devices in the network 100 according to the following steps:

Step 1: To access the home network 100, the UPnP control point 114 first establishes the communication with the gateway 112 in the network 100.

Step 2: The UPnP control point 114 starts the UPnP discovery process by sending a multicast search (M-SEARCH) message over the link 101, to discover online UPnP devices in the network 100.

Step 3: The multicast bridge 116 receives the multicast message, knowing that the message was sent by the UPnP control point 114 over the link 101. The bridge 116 records the IP address and the port number of the UPnP control point 114 and optionally the type of device/service in the search in a control point list.

Step 4: The multicast bridge 116 multicasts the message through the LAN 103 in the network 100.

Step 5: The UPnP device 110 receives the message from the multicast bridge 116.

Step 6: The UPnP device 110 responds with a message back to the multicast bridge 116.

Step 7: Based on the multicast search message, the multicast bridge 116 determines if the UPnP control point 114 is searching for the type of UPnP device 110 that responded with the message. If so, then the multicast bridge 116 modifies a "LOCATION" header of the received message such that the header contains a URL link that points to the HTTP proxy 118. The multicast bridge 116 examines the recorded control point list. For each control point in the list that is waiting for a response, the multicast bridge 116 modifies a "LOCATION" header of the received message such that the header contains a URL link that points to the HTTP proxy 118. The multicast bridge 116 then sends the modified response back to the UPnP control point 114 via the link 101.

Step 8: The UPnP control point 114 receives the message from the multicast bridge 116, and follows the URL link in the "LOCATION" header of the message to send a HTTP request for the device description of the UPnP device 110 from the network 100. Upon receiving such a request, the HTTP proxy 118 obtains the device description from the UPnP device 110. Upon receiving the description, the HTTP proxy 118 examines the device description, and modifies the base URL, the service control URL, the service description URL and the service event subscription URL, such that they all point to the HTTP proxy 118 instead of the UPnP device 110. After modification, the HTTP proxy 118 sends the description back to the remote UPnP control point 114. Thereafter, the remote UPnP control point 114 may further obtain the service description contained in the UPnP device 110 following the same steps as above. After obtaining the device and service description, the remote UPnP control point 114 invokes services on the UPnP device 110, wherein message traffic between the remote UPnP control point 114 and the UPnP device 110 is routed by the HTTP proxy 118 as described above.

Step 9: Periodically, and independently from any UPnP control points, the UPnP device 110 advertises its presence by a multicast "NOTIFY" message in the network 100.

Step 10: When the multicast bridge 116 receives the multicast message from the UPnP device 110, the multicast bridge 116 modifies the "LOCATION" header in the message such that the URL link in the header points to the HTTP proxy 118 instead of the UPnP device 110.

Step 11: The multicast bridge 116 then sends the modified message over the link 101 to the remote UPnP control point 114.

Step 12: The UPnP control point 114 receives the message, and may then follow the URL link in the "LOCATION" header to send a HTTP request for the device description of the UPnP device 110 from the network 100. Upon receiving such request, the HTTP proxy 118 obtains the device description from the UPnP device 110. The HTTP proxy 118 examines the device description, and modifies the base URL, the service control URL, the service description URL and the service event subscription URL, such that they all point to the HTTP proxy 118 instead of the UPnP device 110. Then, the HTTP proxy 118 sends the modified device description to the control point 114 over the link 101. The remote UPnP control point 114 may further obtain the service description contained in the UPnP device 110. After obtaining the device and/or service descriptions for the UPnP device 110, the control point 114 invokes services on the UPnP device 110 by sending invocation messages to the UPnP device 110, wherein the messages are routed by the HTTP proxy 118.

Figure 3:
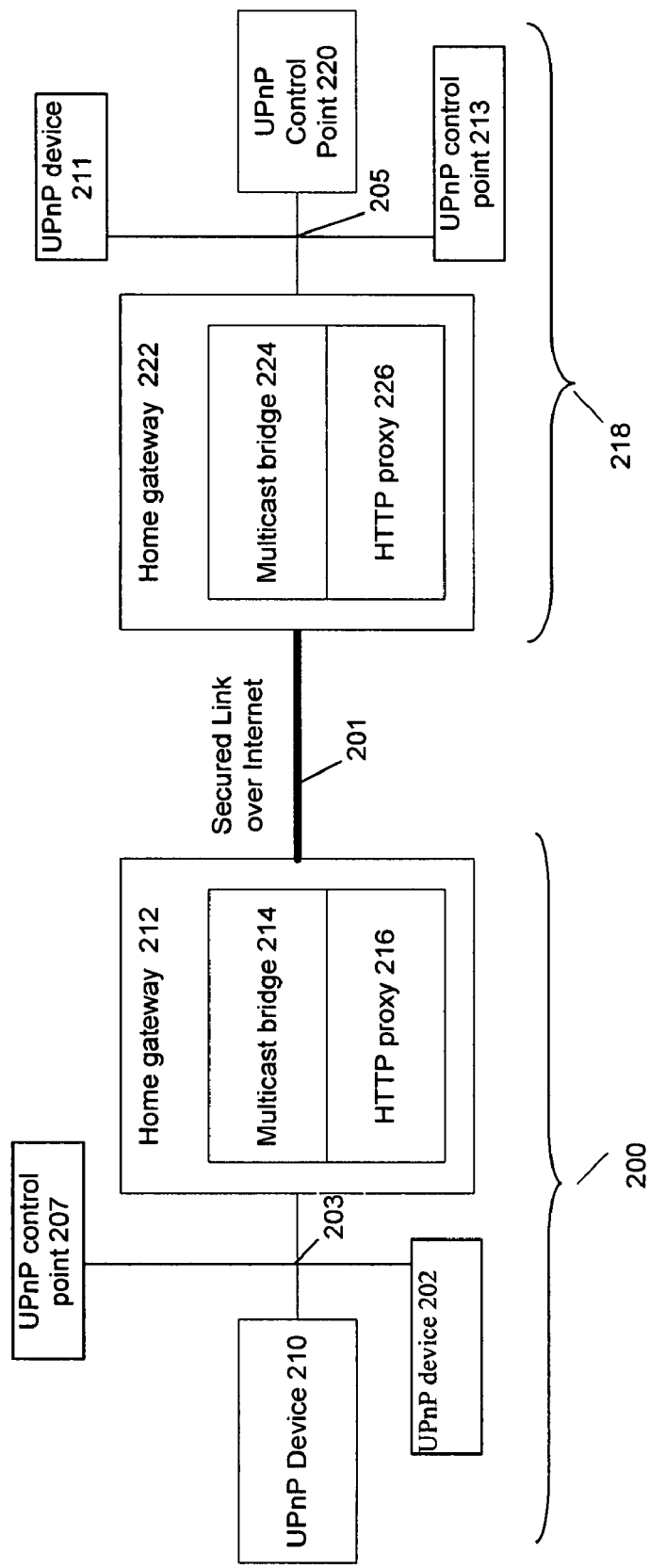
FIG. 3 shows a functional block diagram of another example system which implements remote access to UPnP devices, wherein the UPnP control point in one network connects to another network for remote access, according to the present invention.
Figure 4:
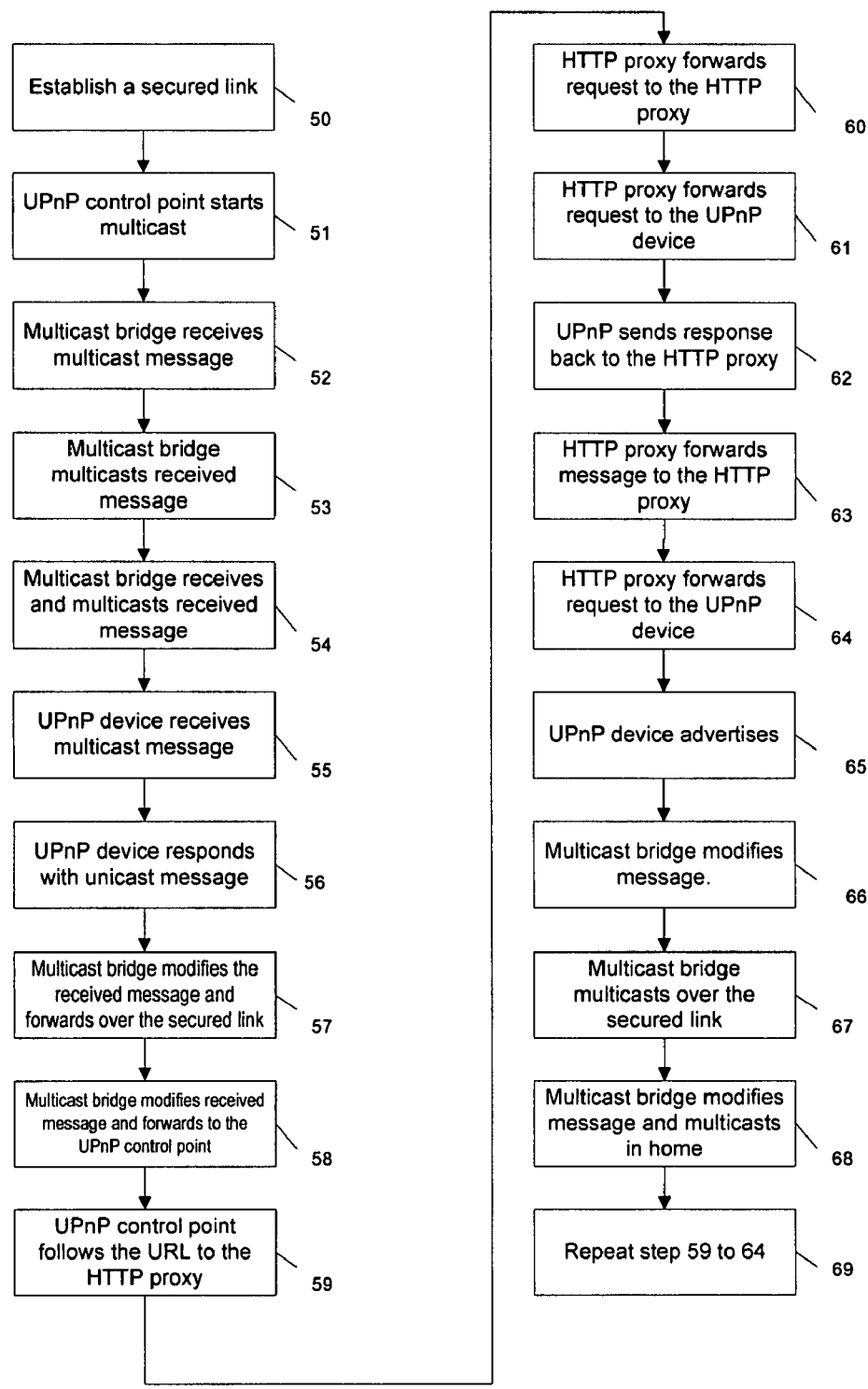
FIG. 4 shows a flowchart of the steps of an example process remote access to UPnP devices in FIG. 3, according to the present invention.

Referring to the example functional block diagram in FIG. 3 and the corresponding process 45 in FIG. 4, another example implementation of the present invention provides a network-to-network remote access for UPnP devices. In the example system 95 shown in FIG. 3, a first private network 200 communicates with a second private network 218 via a communication link 201.

The private network 200 includes UPnP devices 202 and 210, a local UPnP control point 207 and a gateway 212. The gateway 212 includes a multicast bridge 214 and a HTTP proxy 216. The multicast bridge 214 functions as a bridge that forwards multicast and unicast messages in and out of the network 200. A HTTP proxy 216 that hides the devices in the network 200 (including the UPnP devices 210 and 202) from direct access, by remote UPnP control points in another network. In this example, the UPnP devices 202 and 210 and the gateway 212 are connected via a LAN 203 (e.g., Ethernet, 802.11x, etc). The gateway 212 is connected to the second network 218 via the link 201.

As shown in FIG. 3, the second network 218 includes at least a UPnP device 211, UPnP control points 213 and 220 and a gateway 222. Similar to the gateway 212, the gateway 222 includes: (1) a multicast bridge 224 that functions as a bridge that forwards multicast and unicast messages in and out of the network 218, and (2) a HTTP proxy 226 that hides the devices in the network 218 from direct access by UPnP control points in other networks. In this example, the multicast bridges and the HTTP proxies in the networks 200 and 218 are similar.

The gateway 222 and the UPnP control point 220 are connected via a LAN 205, such as Ethernet, 802.11x, etc. The gateway 222 can connect to the first network 200 via the link 201, such as over the Internet.

As in the embodiment described in relation to FIGS. 1-2, proactive search messages from the UPnP control point 220 in the second network 218 are forwarded to the devices in the first network 200 by the multicast bridges 224 and 214. During message forwarding, each of the multicast bridges 224 and 214 modifies the message "LOCATION" header to point to its corresponding HTTP proxies 216 and 226, respectively. Likewise, device advertisement messages from devices in the first network 200 are also forwarded by the multicast bridges 224 and 214. During forwarding, each of the multicast bridges 224 and 214 modifies the message "LOCATION" header to point to its corresponding HTTP proxies 216 and 226 respectively. Requests to obtain device/service descriptions, messages for service invocation from the UPnP control point 220 to devices in the first network 200, and event messages from devices in the first network 200 to the UPnP control point 220 are forwarded by the HTTP proxies 216 and 226.

As noted above, FIG. 4 shows a flowchart of a process 45 for remote access implemented in the system 95 of FIG. 3, including the steps of:

Step 50: To access the network 200, the gateway 222 in the network 218 first establishes the link 201 (e.g., via the Internet) to the gateway 212.

Step 51: The UPnP control point 220 in the network 218 starts the UPnP discovery process by multicasting a multicast message (M-SEARCH) message.

Step 52: The multicast bridge 224 receives the M-SEARCH message, knowing that the message originates from the UPnP control point 220. The bridge 224 records the IP address and the port number of the UPnP control point 220 and optionally the type of device/service in the search in a control point list.

Step 53: The multicast bridge 224 sends the message over the link 201.

Step 54: The multicast bridge 214 receives the message from the multicast bridge 224, and multicasts the message in the network 200.

Step 55: The UPnP device 210 in the network 200 receives the message.

Step 56: The UPnP device 210 responds with a message back to the multicast bridge 214.

Step 57: The multicast bridge 214 receives the message, and modifies the "LOCATION" header in the message such that the header contains the URL that points to the HTTP proxy 216. The bridge 214 then forwards the message back to the multicast bridge 224.

Step 58: The multicast bridge 224 examines the recorded control point list. For each UPnP control point in the list that is searching for the same type, the multicast bridge 224 modifies the "LOCATION" header of the response message such that the header contains a URL link that points to the HTTP proxy 226. After modification of the response message, the multicast bridge 226 sends the modified response message back to the UPnP control point 220.

Step 59: The UPnP control point 220 receives the message and follows the URL link in the message "LOCATION" header to make a HTTP request to obtain a device description of the UPnP device 210.

Step 60: The HTTP proxy 226 receives the request, and forwards the request to the HTTP proxy 216 via the link 201.

Step 61: The HTTP proxy 216 receives the request and forwards it to the UPnP device 210.

Step 62: The UPnP device 210 receives the request and sends the device description back to the HTTP proxy 216.

Step 63: The HTTP proxy 216 forwards the device description to the HTTP proxy 226 via the link 201.

Step 64: The HTTP proxy 226 forwards the device description to the UPnP control point 220. Then, the UPnP control point 220 may further obtain the service description contained in the UPnP device 210 following the same steps as above. After obtaining the device and/or service description for the UPnP device 210, the control point 220 is ready to invoke services on the UPnP device 210 by sending an invocation message to the UPnP device 210 and the messages are routed by the HTTP proxies 226 and 216.

Step 65: Periodically, the UPnP device 210 advertises its presence by multicasting a "NOTIFY" message in the first network 200.

Step 66: When the multicast bridge 216 receives the multicast message from the UPnP device 210, the bridge 216 modifies the message "LOCATION" header in the message such that the URL link in the header points to the HTTP proxy 216 instead of the UPnP device 210.

Step 67: The multicast bridge 216 then forwards the modified message over the link 201 to the multicast bridge 224.

Step 68: The multicast bridge 224 modifies the message "LOCATION" header in the message such that the URL in the header points to the HTTP proxy 226 instead of the HTTP proxy 216. After such modification, the multicast bridge 224 multicasts the message in the network 218.

Step 69: The UPnP control point 220 receives the modified multicast message from the bridge 224 message, and follows the URL link in the message "LOCATION" header to further send a HTTP request for device descriptions of the UPnP device 210 (as described in steps 59 to 64). Then, the control point 220 may further obtain the service descriptions of the UPnP device 210. After obtaining the device and/or service descriptions, the control point 220 is ready to invoke services on the UPnP device 210 by sending invocation messages to the UPnP device 210, wherein the messages are routed by the HTTP proxies 226 and 216.

For network-to-network remote access, the gateways 212 and 222 are configured such that devices, including any UPnP control points in the second network 218, are directly reachable via a TCP connection by the gateway 212 in the network 200. For example, using a VPN, devices on the VPN client side (e.g., the gateway 222) can be directly reachable by the VPN server (e.g., the gateway 212) via the TCP connection. Then, the multicast bridge 224 modifies the M-SEARCH message from the UPnP control point inside the network 218 such that the M-SEARCH message includes an extra header of "Control-Point." The value of this header is the IP address and port number of the UPnP control point from which the M-SEARCH is sent. For example, the M-SEARCH message after modification by the multicast bridge 224 in the gateway 222 of network 218 can comprise:

M-SEARCH*HTTP/1.1
Host: 239.255.255.250:1900
Man: ssdp:discover
MX: 3
ST: ssdp:all
Control-Point: 192.168.0.100:32455

When the multicast bridge 214 in the gateway 212 of the network 200 receives such a message, the multicast bridge 214 knows where this message comes from, and as a result, when the UPnP devices respond to this message, the multicast bridge 214 in the gateway 212 can send the response back to the UPnP control point directly.

The present invention also enables existing remote UPnP control points (e.g., on the Internet and/or in other networks) to remotely access devices, services and contents in a private network without modification to UPnP standards. As such, existing UPnP devices can operate without modification within the context of the present invention. Further, multicast forwarding in the private network gateway is not required.

Figure 5:
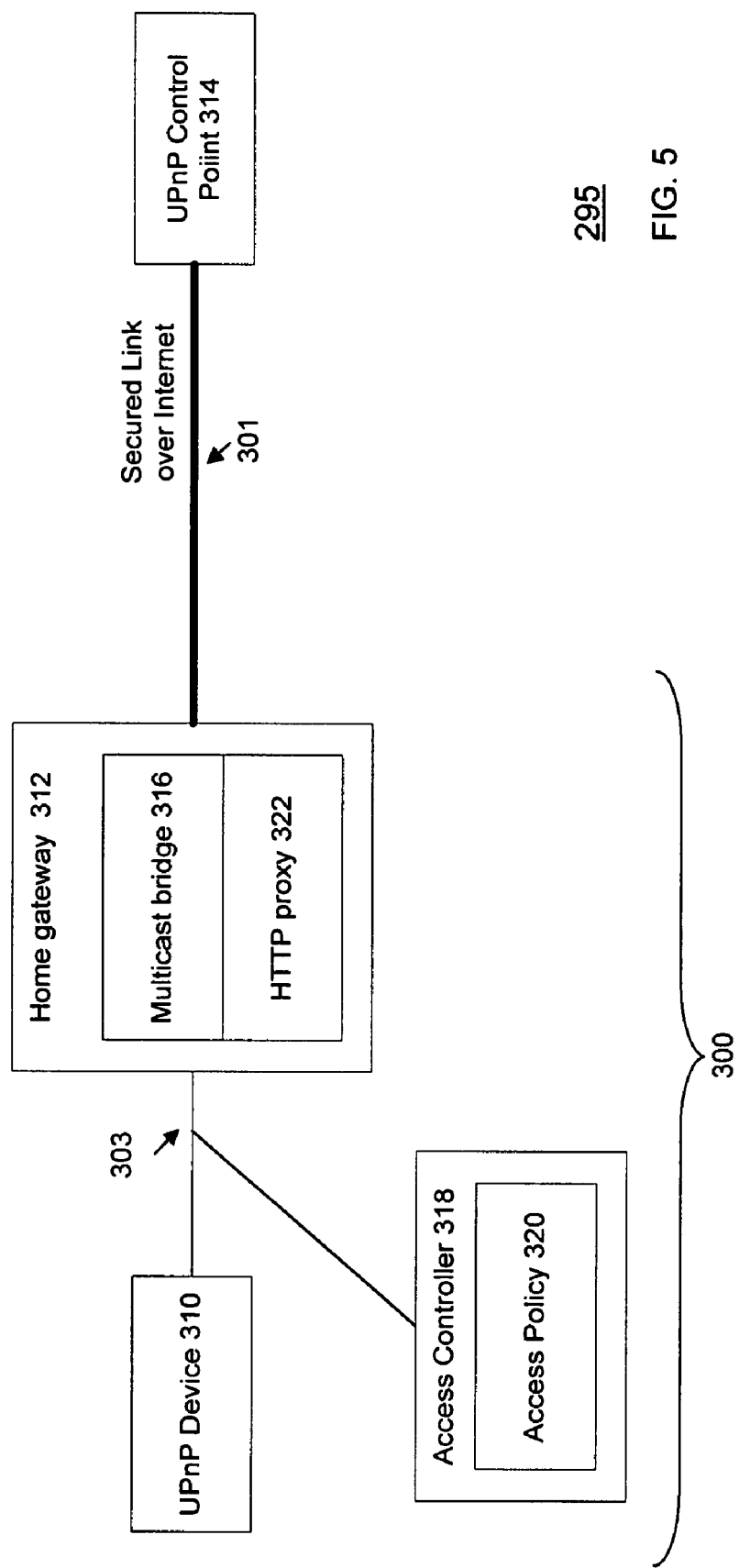
FIG. 5 shows a functional block diagram of another example system which implements remote access to UPnP devices in a network, according to the present invention.

Referring to the example functional block diagram in FIG. 5 and the corresponding flowchart in FIG. 6, according to the present invention, an example process of a remote UPnP control point accessing resources (i.e., UPnP devices and/or services) in a private network via a communication link is now described.

FIG. 5 shows an example system 295 wherein a private network 300, such a home network, includes at least one UPnP device 310 (e.g., a camera, a consumer electronics device, a PC, etc.) and a gateway 312. The network 300 can include other devices such as another UPnP device and a local UPnP control point (similar to FIG. 1). The gateway 312 and the UPnP device 310 are connected via a LAN 303, such as Ethernet, 802.11x, etc. A remote UPnP control point 314 can connect to the network 300 via a communication link 301 (e.g., a secured link over the Internet), wherein the control point 314 has a public IP address and can be reached via that public IP address.

The gateway 312 comprises a multicast bridge 316 and an HTTP proxy 322. The multicast bridge 316 functions as a bridge between the home network 300 and the link 301 to the remote control point (CP) 314, wherein the bridge 316 forwards a multicast/unicast message from the network 300 through the link 301 and vice versa. The HTTP proxy 322 relays the UPnP request and response messages (including messages to obtain device and service descriptions, service invocation and eventing) between the remote UPnP CP 314 and the devices in the network 300 (e.g., device 310). In one example, to access the UPnP device 310 in the network 300, the remote UPnP CP 314 must first send requests to the HTTP proxy 322 wherein the HTTP proxy 322 then forwards the requests to the devices (e.g., UPnP device 310) in the network 300.

The network 300 implements a modified SSDP to address the conventional timeout issue. In the conventional UPnP architecture, the MX header in the M-SEARCH is used to indicate how long a CP should wait for a device response. For a device to be discoverable by the M-SEARCH message, the device must send a SSDP response within the specified MX value. This usually is not a problem when the discovering device (i.e., the CP) and the discovered device (UPnP device) are in the same LAN because the network latency is typically small. However, if the CP is external to the LAN that includes the UPnP device (e.g., the CP connects to the LAN via a communication link such as the Internet), then the M-SEARCH request from the CP to the UPnP device, and the response from a UPnP device to the CP must traverse the communication link, for which the network latency can be large and predictable. If the CP on the communication link cannot receive a SSDP response from a UPnP device in a remote network (e.g., LAN) within the specified MX value interval, then the CP considers the UPnP device to be offline.

The UPnP architecture defines an interval for a UPnP device to advertise its presence, which can be an interval up to 1800 seconds. As a result, if the CP does not receive a UPnP device SSDP response, the CP must wait up to 1800 seconds before it times out. This is undesirable however because a user accessing a UPnP device using the CP expects to see all available devices with no obvious delay. To minimize the effect of unpredictable network latency in response to a M-SEARCH of a CP on a communication link such as the Internet, the multicast bridge 316 proactively sends device SSDP advertisements to the remote control point 314 in addition to normal SSDP M-SEARCH responses. This proactive advertisement occurs immediately after the multicast bridge 316 forwards the UPnP device response to the SSDP M-SEARCH. The proactive device SSDP advertisement reduces the wait interval for receiving a device SSDP advertisement, wherein even if the CP on the communication link does not receive a SSDP response message from the UPnP device within the value specified in the MX header, the CP still receives the device SSDP advertisement without waiting for up to 1800 seconds. As such, the control point need not wait for the entire timeout period of 1800 seconds.

The network 300 further includes an access controller 318 which maintains an access policy module 320, which together implement access control measures to enforce device discovery and security. This enables access control for discovering devices and/or services in the network. In the UPnP architecture, every physical consumer electronics device contains at least a root UPnP device, and a list of possible sub-devices. A sub-device can contain another level of sub-devices. The level of sub-devices can be unlimited. A UPnP device can also contain a list of services, which describes a list of actions that a CP can invoke.

The purpose of device level access control according to the present invention is to only expose those network devices that can be visible to a remote CP on the secured communication link (e.g., the Internet) according to an access policy, while hiding other network devices. Similarly, the purpose of service level access control according to the present invention is to only expose those UPnP services that can be visible to a CP on the secured communication link (e.g., the Internet) according to an access policy, while hiding other UPnP services.

The access control policy module 320 manages the policies for controlling accesses to the UPnP devices and services. For example, the access control policy module 320 can specify that the UPnP device 310 (e.g., a surveillance camera) cannot be discovered by the remote CP 314 on the Internet. An example of the service level access policy would be that a UPnP AVTransport service in a home TV should not be accessed remotely by a CP 314 on the Internet. The HTTP proxy 322 hides the actual UPnP devices, including the UPnP device 310 from being accessed directly by the remote UPnP CP 314. To access the UPnP device 310, the UPnP CP 314 must first send requests to the HTTP proxy 322. The HTTP proxy 322 then forwards the requests to the UPnP devices in the network 300.

Referring to the example process 70 in FIG. 6, the steps for addressing the conventional timeout issue in the network 300 (FIG. 5) according to the present invention include:

Step 71: The UPnP device 310 multicasts its presence by sending a UPnP SSDP alive advertisement message in the LAN 303.

Step 72: The multicast bridge 316 receives the message and saves the message in a memory location.

Step 73: At a later time, the CP 314 establishes a connection to the network 300 and starts a discovery process by multicasting a SSDP M-SEARCH to the network 300 via a secured connection over the link 301. In the SSDP M-SEARCH, the CP 314 also specifies a MX header including a wait value.

Step 74: The multicast bridge 316 receives the SSDP M-SEARCH multicast message via the secured connection, and records the IP address and the port number of the UPnP CP 314 (and optionally the type of device/service in the search) in a control point list.

Step 75: The multicast bridge 316 multicasts the SSDP M-SEARCH message to the LAN 303 in the network 300.

Step 76: The UPnP device 310 on the LAN 303 receives the SSDP M-SEARCH message from the multicast bridge 316.

Step 77: The UPnP device 310 responds with a unicast response message back to the multicast bridge 316.

Step 78: The multicast bridge 316 examines the recorded control point list. For each control point in the list that is waiting for the responses, the multicast bridge 316 modifies the "LOCATION" header of the response message such that the header contains an address such as a URL link that points to the HTTP proxy 322 in the gateway 312. The multicast bridge 316 then unicasts the modified response message back to the UPnP control point 314 via the secured connection over the link 301.

Step 79: After forwarding the response message, the multicast bridge 316 looks up its memory for stored UPnP SSDP alive messages (e.g., the stored UPnP SSDP alive message from the UPnP device 310). For each stored UPnP SSDP alive advertisement message, the multicast bridge 316 modifies the "LOCATION" header such that the "LOCATION" points to the HTTP proxy 322. Then the multicast bridge 316 sends the modified alive message to the control point 314 via the secured connection over the link 301. The proactive SSDP alive message in this step addresses the aforementioned timeout issue.

Step 80: The UPnP control point 314 receives the modified response message corresponding to the UPnP device 310 from the multicast bridge 316. In this example, the modified response message reaches the UPnP control point 314 after the MX wait value (e.g., due to the long latency over the secured connection), whereby the UPnP CP 314 considers the UPnP device 310 as not responding and discards the modified response message.

Step 81: Thereafter, the UPnP control point 314 receives the modified alive message corresponding to the UPnP device 310 from the multicast bridge 316. The modified alive message informs the UPnP CP 314 that the UPnP device 310 is online.

In another implementation, access control involves controlling remote discovery of UPnP devices and/or services using an access controller that checks access policies before allowing remote device and/or service discovery. Such access control further involves addressing the timeout issue in the current UPnP architecture by proactively sending out device advertisements such as UPnP SSDP advertisements in addition to normal SSDP M-SEARCH responses. The proactive device SSDP advertisement reduces the wait interval for a remote control point in receiving a device SSDP advertisement, wherein even if the control point does not receive a SSDP response message from the UPnP device within a specified interval, the control point still receives the device SSDP advertisement without waiting for an entire timeout interval.

Referring to the example access control process 82 in FIG. 7, the remote UPnP CP 314 access devices and service descriptions in the network 300 (FIG. 5), using the following steps according to the present invention:

Step 83: To obtain a device description, the UPnP CP 314 sends a request to the gateway 312 via the secured connection over the link 301, for a description of the UPnP device 310.

Step 84: The HTTP proxy 322 receives the request, modifies a "LOCATION" header of the request to point to the HTTP proxy 322 and forwards it to the modified request UPnP device 310.

Step 85: The UPnP device 310 replies to the modified request by providing its device description to the HTTP proxy 322. The HTTP proxy 322 consults with the access controller 318 to determine whether the UPnP device 310 should be visible to the UPnP CP 314.

Step 86: The access controller 318 looks up the access control policy 320 for the access policy and returns the result back to the HTTP proxy 322.

Step 87: Then a determination is made based on the access policy whether the UPnP device 310 can be accessible by the CP 314. If not, the process proceeds to step 88, otherwise the process proceeds to step 89.

Step 88: The HTTP proxy 322 removes the entire device description and sends a response to the CP 314 as though the UPnP device 310 does not exist. Proceed to step 89.

Step 89: The HTTP proxy 322 changes the BaseURL (typically in the device description) to point to the HTTP proxy 322.

Step 90: For each service list in the device description, the HTTP proxy 322 consults with the access controller 318 to determine whether each service in the service list should be accessible to the UPnP CP 314.

Step 91: The access controller 318 looks up the access control policy 320 and returns the result back to the HTTP proxy 322.

Step 92: Then a determination is made based on the access policy whether each service can be accessible by the CP 314. If yes, the process proceeds to step 93, otherwise the process proceeds to step 94.

Step 93: Then for each service in the service list, the HTTP proxy 322 changes a service description URL, an event subscription URL, and a service control URL to point to the HTTP proxy 322. Proceed to step 95.

Step 94: If a service is not accessible, the HTTP proxy 322 removes the entire service section from the device description.

Step 95: The HTTP proxy 322 then sends the modified device description or service description back to the remote CP 314.

Step 96: The CP 314 receives the device specification and/or the service descriptions of the UPnP device 310. Based on the device specification and/or the service descriptions of the UPnP device 310, an application using the CP 314 may request services from the device 310.

The process 82 allows access control assertion at the device level and the service level during remote accesses (e.g., by the control point 314 on the link 301), and can be used in combination with the process 15 (FIG. 2) or the process 45 (FIG. 4) above.

A device description describes the following major information: (1) device type, for example, a Media Renderer, (2) device name, manufacturer, manufacturer URL, (3) device model description, device serial number, (4) device UUID (universally unique identification), (5) sub-device list, (6) service list, such as service type, service description URL, event URL, etc. A service description includes the following major information: (1) service version and (2) action lists containing action invocation and action result specifications. Device and service description are in XML format. A UPnP device contains the device description and service description.

The process 70 in FIG. 6 can be modified such that certain UPnP device or service SSDP alive messages are not forwarded from the network 300 to the remote control point 314 if according to access policy, said UPnP devices should not be accessible to the control point 314. Thus if steps 78, 79, 80 and 81 in FIG. 6 are modified accordingly, such that before forwarding a device and service unicast UPnP response message from the network 300 back to the remote control point 314, the multicast bridge 316 first consults with the access controller 318 to determine whether the device/service is accessible for the control point 314 or not. If a device is accessible, the multicast 316 will then go through steps 78, 79, 80 and 81. Otherwise, the multicast bridge 316 discards the UPnP response. Similarly, the multicast bridge 316 does not forward the SSDP alive message on behalf of the device/service that should not be discovered/accessed by the remote control point (remote device) 314.

As is known to those skilled in the art, the aforementioned example architectures described above, according to the present invention, can be implemented in many ways, such as program instructions for execution by a processor, as logic circuits, as an application specific integrated circuit, as firmware, etc. The present invention has been described in considerable detail with reference to certain preferred versions thereof; however, other versions are possible. Therefore, the spirit and scope of the appended claims should not be limited to the description of the preferred versions contained herein.

What is claimed is:

1. A method for remote access to one or more Universal Plug and Play (UPnP) resources, comprising:
    employing a processor for, maintaining an access policy for discovery of a UPnP resource over a communication link via UPnP communication protocol, wherein the access policy comprises access control measures for enforcing device discovery and security;
    a remote requestor accessing the UPnP resource over the communication link by performing message forwarding at a UPnP layer in a network connecting the UPnP resource and the remote requestor via the communication link; and
    controlling discovery of a resource based on the access policy, in response to a remote discovery request over the communication link;
    wherein accessing the UPnP resource comprises:
        upon receiving the remote discovery request from the remote requester over the communication link, consulting the access policy and using the access policy to determine if the UPnP resource is discoverable, wherein the remote requester comprises a UPnP module; and
        if the resource is discoverable, then providing resource information to the remote requester over the communication link for access to the UPnP resource, the network is a local network, and controlling discovery is performed by a controller in the local network, and the UPnP resource is local to the network and the remote requester is external to the network, and the communication link comprises a connection network.

2. The method of claim 1 wherein receiving a emote discovery request includes: the proxy receiving a remote discovery request from the remote requester and the controller consulting the access policy such that if the resource is discoverable, then the proxy providing resource information to the requester over the communication link.

3. The method of claim 1 wherein the UPnP resource comprises a UPnP device.

4. The method of claim 1 wherein the UPnP resource comprises a service performed by one or more UPnP devices.

5. The method of claim 1 wherein a service is discoverable if, according to the access policy: (a) one or more devices that host the service are discoverable, and (b) the service is discoverable.

6. The method of claim 1 consulting the access policy and determining if the resource is discoverable further includes consulting the access policy to determine if the resource is discoverable to that remote requester.

7. The method of claim 1 wherein the local network comprises a local area network (LAN).

8. The method of claim 1 wherein the local network comprises a virtual private network (VPN).

9. The method of claim 1 wherein the connection network comprises the Internet.

10. A method for remote access to one or more Universal Plug and Play (UPnP) devices in a local network, comprising:
    employing a processor for, receiving a Simple Service Discovery Protocol (SSDP) M-SEARCH message from a remote UPnP control point external to the local network asynchronously over a communication link, wherein the remote UPnP control point is configured for accessing a UPnP resource over the communication link;
    controlling discovery of a resource based on an access policy, in response to a remote discovery request over the communication link;
    upon receiving the SSDP M-SEARCH message, consulting the access policy and using the access policy to determine if the resource is discoverable, wherein the remote requester comprises a UPnP device, wherein the access policy comprising access control measures for enforcing device discovery and security;
    responding with a SSDP M-SEARCH response to the control point over the communication link; and
    sending a UPnP SSDP alive advertisement message to the control point over the communication link immediately after the SSDP M-SEARCH response without waiting for a UPnP standard time out period,
wherein controlling discovery is performed by a controller in the local network, the UPnP resource is local to the local network and the remote requester is external to the local network, and the communication link comprises a connection network.

11. The method of claim 9 further comprising:
    a UPnP device in the network sending a UPnP SSDP alive advertisement message; and
    capturing and storing the UPnP SSDP alive advertisement message;
    forwarding the M-SEARCH message to the UPnP device and receiving a response from the UPnP device;
    sending the SSDP M-SEARCH response to the control point over the communication link; and
    sending the stored UPnP SSDP alive advertisement message to the control point over the communication link.

12. An apparatus for remote access to one or more Universal Plug and Play (UPnP) resources in a local network, comprising:
    an access policy for discovery and securing of a UPnP resource in the local network over a communication link via UPnP communication protocol;

a proxy to a UPnP control point external to the local network configured for enabling the UPnP control point to access the UPnP resource via the proxy over the communication link, the proxy further configured for providing the UPnP control point access to services and content in the UPnP resource in the local network over the communication link, by performing message forwarding at a UPnP layer in the local network; and a controller in the local network configured for controlling discovery of a resource based on the access policy, in response to a remote discovery request from a remote requester external to the local network over the communication link, wherein the remote requester comprises a UPnP device, wherein the access policy comprising access control measures for enforcing device discovery and security, wherein the UPnP resource is local to the local network and the remote requester is external to the local network, and the communication link comprises a connection network.

13. The apparatus of claim 12 wherein the controller is further configured to consult the access policy and if the resource is discoverable, the controller provides resource information to the requester over the communication link.

14. The apparatus of claim 13 further comprising proxy for controlling access to a resource over the communication link, by performing message forwarding at the UPnP layer in the network.

15. The apparatus of claim 14 wherein the proxy is further configured for receiving a remote discovery request from the remote requester and the controller is further configured for consulting the access policy such that if the resource is discoverable, then the proxy provides resource information to the requester over the communication link.

16. The apparatus of claim 12 wherein the resource comprises a UPnP device.

17. The apparatus of claim 12 wherein the resource comprises a service performed by one or more UPnP devices.

18. The apparatus of claim 12 wherein a service is discoverable if, according to the access policy: (a) one or more devices that host the service are discoverable, and (b) the service is discoverable.

19. The apparatus of claim 12 wherein the controller is further configured for consulting the access policy to determine if the resource is discoverable to that remote requester.

20. The apparatus of claim 12 wherein the network comprises a local area network (LAN).

21. The apparatus of claim 12 wherein the network comprises a virtual private network (VPN).

22. The apparatus of claim 12 wherein the communication link comprises a connection network.

23. The apparatus of claim 22 wherein the connection network comprises the Internet.

24. An apparatus for remote access to one or more Universal Plug and Play (UPnP) devices in a local network, comprising:

a bridge configured to interface between the local network and a control point external to the local network over a communication link;

a proxy configured for receiving a Simple Service Discovery Protocol (SSDP) M-SEARCH message from the control point via the bridge, for responding with a SSDP M-SEARCH response to the control and for immediately sending a UPnP SSDP alive advertisement message after the SSDP M-SEARCH response to the control point over the communication link, via the bridge without waiting for a UPnP standard time out period, wherein the external UPnP control point is configured for accessing a UPnP resource over the communication link, and upon receiving the SSDP M-SEARCH message, consulting an access policy and using the access policy to determine if the resource is discoverable, wherein the access policy comprising access control measures for enforcing device discovery and security, the access control measures are performed by a controller in the local network, the UPnP resource is local to the local network and the remote requester is external to the network, and the communication link comprises a connection network.

25. The apparatus of claim 24 wherein:

a UPnP device in the network sending a UPnP SSDP alive advertisement message;

the proxy is further configured for capturing and storing the UPnP SSDP alive advertisement message, forwarding the M-SEARCH message to the UPnP device and receiving a response from the UPnP device, sending the SSDP M-SEARCH response to the control point, and sending the stored UPnP SSDP alive advertisement message to the control point.

26. The method of claim 1, further comprising:

sending an alive advertisement message to the remote requester over the communication link immediately after sending a response to the remote discovery request without waiting for a predetermined time out period.

27. The apparatus of claim 12, wherein the access policy denies access to local devices from a remote device external to the local network based on local service access policy.

28. A method for remote access to one or more Universal Plug and Play (UPnP) devices in a local network, comprising:

employing a processor for, providing an address of a proxy to a remote UPnP control point external to the local network to enable the UPnP control point to access a UPnP resource via the proxy over a communication link, the proxy providing the UPnP control point access to services and content in the UPnP resource in the local network over the communication link, by performing message forwarding at a UPnP layer in the local network;

receiving a Simple Service Discovery Protocol (SSDP) M-SEARCH message from the UPnP control point asynchronously over the communication link;

consulting an access policy and using the access policy to determine if the UPnP resource is discoverable, wherein the access policy comprising access control measures for enforcing device discovery and security;

responding with a SSDP M-SEARCH response to the UPnP control point over the communication link; and sending a UPnP SSDP alive advertisement message to the UPnP control point over the communication link immediately after the SSDP M-SEARCH response without waiting for a UPnP standard time out period, wherein the access control measures are performed by a controller in the local network, the UPnP resource is local to the local network and the remote requester is external to the local network, and the communication link comprises a connection network.

29. The method of claim 1, further comprising:
providing an address of a proxy to the UPnP control point to enable the UPnP control point to access the UPnP resource via the proxy over the communication link, the proxy providing the UPnP control point access to services and content in the UPnP resource in the local network over the communication link.

30. The method of claim 1, wherein the remote requester comprises a UPnP device including a UPnP resource discoverable by a local UPnP control point in the local network.

31. The method of claim 30, wherein access control exposes local network devices that are visible based on the access policy to the local UPnP control point while hiding other local network devices.

32. The method of claim 1, wherein the remote requester comprises a UPnP device including the UPnP control point.

* * * * *